United States Patent
Bae et al.

(10) Patent No.: US 11,545,718 B2
(45) Date of Patent: Jan. 3, 2023

(54) CROSSLINKED POLYOLEFIN SEPARATOR AND MANUFACTURING METHOD THEREOF

(71) Applicant: LG Chem, Ltd., Seoul (KR)

(72) Inventors: Won-Sik Bae, Daejeon (KR); Bi-Oh Ryu, Daejeon (KR); Joo-Sung Lee, Daejeon (KR)

(73) Assignee: LG Chem, Ltd.

( * ) Notice: Subject to any disclaimer, the term of this patent is extended or adjusted under 35 U.S.C. 154(b) by 167 days.

(21) Appl. No.: 16/755,231

(22) PCT Filed: Aug. 14, 2019

(86) PCT No.: PCT/KR2019/010398
§ 371 (c)(1),
(2) Date: Apr. 10, 2020

(87) PCT Pub. No.: WO2020/036451
PCT Pub. Date: Feb. 20, 2020

(65) Prior Publication Data
US 2020/0266410 A1    Aug. 20, 2020

(30) Foreign Application Priority Data

Aug. 17, 2018 (KR) .................. 10-2018-0096251

(51) Int. Cl.
| | | |
|---|---|---|
| *B29C 48/91* | (2019.01) | |
| *H01M 50/411* | (2021.01) | |
| *B29C 48/00* | (2019.01) | |
| *C08J 3/24* | (2006.01) | |
| *C08J 5/18* | (2006.01) | |
| *C08J 9/26* | (2006.01) | |
| *H01M 50/403* | (2021.01) | |
| *H01M 50/581* | (2021.01) | |
| *B29K 105/24* | (2006.01) | |
| *B29L 31/34* | (2006.01) | |

(52) U.S. Cl.
CPC ....... *H01M 50/411* (2021.01); *B29C 48/0018* (2019.02); *B29C 48/91* (2019.02); *C08J 3/247* (2013.01); *C08J 5/18* (2013.01); *C08J 9/26* (2013.01); *H01M 50/403* (2021.01); *H01M 50/581* (2021.01); *B29K 2023/06* (2013.01); *B29K 2105/24* (2013.01); *B29L 2031/3468* (2013.01); *C08J 2201/042* (2013.01); *C08J 2323/04* (2013.01); *H01M 2200/103* (2013.01)

(58) Field of Classification Search
CPC ........ B29C 48/0018; B29C 48/91; C08J 5/18; C08J 2201/042; C08J 2323/04
See application file for complete search history.

(56) References Cited

U.S. PATENT DOCUMENTS

| | | | |
|---|---|---|---|
| 5,741,858 A | 4/1998 | Brann et al. | |
| 2003/0175460 A1 | 9/2003 | Ho et al. | |
| 2009/0098465 A1 | 4/2009 | Kikuchi et al. | |
| 2010/0227223 A1 | 9/2010 | Noumi et al. | |
| 2011/0182656 A1 | 7/2011 | Babb | |
| 2011/0236764 A1 | 9/2011 | Takita et al. | |
| 2012/0028101 A1 | 2/2012 | Ishihara et al. | |
| 2012/0070748 A1 | 3/2012 | Ishihara et al. | |
| 2012/0082899 A1 | 4/2012 | Ishihara et al. | |
| 2014/0342238 A1* | 11/2014 | Lee ................ | B29C 48/32 264/210.1 |
| 2016/0126518 A1 | 5/2016 | Park et al. | |
| 2021/0115206 A1* | 4/2021 | Toyota ............ | C08J 5/18 |

FOREIGN PATENT DOCUMENTS

| | | |
|---|---|---|
| CN | 1780028 A | 5/2006 |
| CN | 104231418 A | 12/2014 |
| CN | 104272500 A | 1/2015 |
| CN | 105576172 A | 5/2016 |
| JP | H11269289 A | 10/1999 |
| KR | 20110095268 A | 8/2011 |
| KR | 20120047857 A | 5/2012 |
| KR | 101174986 B1 | 8/2012 |
| KR | 20120089796 A | 8/2012 |
| KR | 20150021557 A | 3/2015 |
| KR | 20160052332 A | 5/2016 |
| KR | 20160097958 A | 8/2016 |
| KR | 20160129580 A * | 11/2016 |
| KR | 20160131761 A | 11/2016 |
| KR | 20160146134 A | 12/2016 |
| KR | 101793112 B1 | 11/2017 |
| KR | 20180024101 A | 3/2018 |
| KR | 20180032727 A | 4/2018 |
| KR | 20180033487 A | 4/2018 |

OTHER PUBLICATIONS

Translation of KR20160146134 A (Year: 2016).*
Chinese Search Report for Application No. 201980004599.7 dated Aug. 31, 2021, pp. 1-3.
Search report from International Application No. PCT/KR2019/010398, dated Nov. 28, 2019.
Extended European Search Report including Written Opinion for EP19850199.1 dated Nov. 9, 2020; 9 pages.

* cited by examiner

Primary Examiner — Timothy Kennedy
Assistant Examiner — Farah Taufiq
(74) Attorney, Agent, or Firm — Lerner, David, Littenberg, Krumholz & Mentlik, LLP

(57) ABSTRACT

A method for manufacturing a crosslinked polyolefin separator and a separator are provided. The method includes putting a polyolefin and a polyolefin elastomer into an extruder first, and putting an alkoxy silane containing a carbon-carbon double bond functional group, an initiator and a crosslinking catalyst to form the separator. The crosslinked polyolefin separator has high meltdown temperature and low shutdown temperature.

11 Claims, No Drawings

CROSSLINKED POLYOLEFIN SEPARATOR AND MANUFACTURING METHOD THEREOF

CROSS-REFERENCE TO RELATED APPLICATIONS

The present application is a national phase entry under 35 U.S.C. § 371 of International Application No. PCT/KR2019/010398 filed Aug. 14, 2019, which claims priority from Korean Patent Application No. 10-2018-0096251 filed on Aug. 17, 2018, all of which are incorporated herein by reference.

TECHNICAL FIELD

The present disclosure relates to a crosslinked polyolefin separator and a manufacturing method thereof.

BACKGROUND ART

Recently, there has been an increasing interest in energy storage technology day by day. As the application field of energy storage technology has been extended to mobile phones, camcorders, lap-top computers, and even electric cars, many efforts have been devoted to studying and developing electrochemical devices. In this aspect, electrochemical devices are attracting more attention, and especially, development of rechargeable secondary batteries is the focus of attention, and more recently, in the development of batteries, new electrode and battery design for improving the capacity density and specific energy have been studied and developed.

In currently available secondary batteries, lithium secondary batteries developed in early 1990's have much higher operating voltage and energy density than traditional batteries using an aqueous electrolyte solution such as Ni-MH, Ni—Cd and lead-acid batteries, and by virtue of these advantages, lithium secondary batteries are gaining much attention.

A lithium secondary battery includes a positive electrode, a negative electrode, an electrolyte solution and a separator, and the separator is required to have insulating properties to separate the positive electrode from the negative electrode for electrical isolation and high ionic conductivity to increase the lithium ion permeability based on high porosity.

The separator needs to have a large difference between shutdown temperature and meltdown temperature to ensure the safety of the lithium secondary battery including the separator. To increase the difference between meltdown temperature and shutdown temperature, it is necessary to perform control to reduce the shutdown temperature and increase the meltdown temperature.

DISCLOSURE

Technical Problem

Therefore, the present disclosure is directed to providing a method for manufacturing a crosslinked polyolefin separator with high meltdown temperature and low shutdown temperature and a separator manufactured by the method.

Technical Solution

An aspect of the present disclosure provides a method for manufacturing a crosslinked polyolefin separator according to the following implementation embodiments.

A first implementation embodiment relates to the method for manufacturing a crosslinked polyolefin separator including (S1) putting a polyolefin, a polyolefin elastomer and a first diluent into an extruder and mixing them, (S2) putting a second diluent, an alkoxy silane containing a carbon-carbon double bond functional group, an initiator and a crosslinking catalyst into the extruder, and mixing them for reactive extrusion of a silane grafted polyolefin composition, (S3) forming the silane grafted polyolefin composition obtained by the reactive extrusion into a shape of a sheet and stretching the sheet, (S4) extracting the first diluent and the second diluent from the stretched sheet to produce a porous membrane, (S5) heat-setting the porous membrane, and (S6) crosslinking the heat-set porous membrane in the presence of moisture, wherein a weight ratio of the polyolefin and the polyolefin elastomer is 94:6 to 65:35, and a ratio of an elapsed time between the introduction of the second diluent and the extrusion to an elapsed time between the introduction of the polyolefin, the polyolefin elastomer and the first diluent and the extrusion is 0.3 to 0.7.

In the first implementation embodiment, a second implementation embodiment relates to the method for manufacturing a crosslinked polyolefin separator in which a weight average molecular weight of the polyolefin is 200,000 to 1,000,000.

In the first or second implementation embodiment, a third implementation embodiment relates to the method for manufacturing a crosslinked polyolefin separator in which the polyolefin elastomer includes a copolymer of at least two of ethylene, propylene, butene, pentene, 4-methylpentene, hexene and octene.

In any one of the first to third implementation embodiments, a fourth implementation embodiment relates to the method for manufacturing a crosslinked polyolefin separator in which a melt index of the polyolefin elastomer is 0.1 to 30 g/10 min.

In any one of the first to fourth implementation embodiments, a fifth implementation embodiment relates to the method for manufacturing a crosslinked polyolefin separator in which a temperature of the heat-setting is 100° C. to 140° C.

In any one of the first to fifth implementation embodiments, a sixth implementation embodiment relates to the method for manufacturing a crosslinked polyolefin separator in which a weight ratio of the polyolefin and the polyolefin elastomer is 90:10 to 70:30.

In any one of the first to sixth implementation embodiments, a seventh implementation embodiment relates to the method for manufacturing a crosslinked polyolefin separator in which the ratio of the elapsed time between the introduction of the second diluent and the extrusion to the elapsed time between the introduction of the polyolefin, the polyolefin elastomer and the first diluent and the extrusion is 0.3 to 0.5.

In any one of the first to seventh implementation embodiments, an eighth implementation embodiment relates to the method for manufacturing a crosslinked polyolefin separator in which a difference between a shutdown temperature and a meltdown temperature of the separator is 25° C. to 70° C.

In the eighth implementation embodiment, a ninth implementation embodiment relates to the method for manufacturing a crosslinked polyolefin separator in which the shutdown temperature of the separator is 135° C. or less, and the meltdown temperature of the separator is 160° C. or above.

In any one of the first to ninth implementation embodiments, a tenth implementation embodiment relates to the method for manufacturing a crosslinked polyolefin separator in which the weight ratio of the first diluent and the second diluent is 30:70 to 70:30.

Another aspect of the present disclosure provides a crosslinked polyolefin separator according to the following implementation embodiment.

An eleventh implementation embodiment relates to the crosslinked polyolefin separator manufactured by the method of any one of the first to tenth implementation embodiments.

Advantageous Effects

The method for manufacturing a crosslinked polyolefin separator according to an embodiment of the present disclosure can provide a crosslinked polyolefin separator with low shutdown temperature using a combination of polyolefin and polyolefin elastomer.

The method for manufacturing a crosslinked polyolefin separator according to an embodiment of the present disclosure can provide a crosslinked polyolefin separator with high meltdown temperature through a silane moisture crosslinking reaction process.

The method for manufacturing a crosslinked polyolefin separator according to an embodiment of the present disclosure can provide a crosslinked polyolefin separator having improved silane crosslinking uniformity and uniform meltdown temperature in the thicknesswise direction, by putting a polyolefin, a polyolefin elastomer and a first diluent into a first extruder and mixing them, and then putting a second diluent and a crosslinking additive, for example, an alkoxy silane containing a carbon-carbon double bond functional group.

MODE FOR DISCLOSURE

Hereinafter, the present disclosure will be described in detail. It should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The present disclosure relates to a method for manufacturing a crosslinked polyolefin separator and a crosslinked polyolefin separator.

Separators used in lithium secondary batteries have good safety when a difference between shutdown temperature and meltdown temperature is large. In this instance, to increase the difference between shutdown temperature and meltdown temperature, it is necessary to perform control to reduce the shutdown temperature and increase the meltdown temperature.

For example, when the shutdown temperature exceeds 136° C., the manufactured separator has a safety problem with hot box test failures.

To address this issue, the inventors provide a method for manufacturing a separator having high meltdown temperature and low shutdown temperature and a crosslinked polyolefin separator manufactured thereby.

The method for manufacturing a crosslinked polyolefin separator according to an aspect of the present disclosure includes:

(S1) putting a polyolefin, a polyolefin elastomer and a first diluent into an extruder, and mixing them;

(S2) putting a second diluent, an alkoxy silane containing a carbon-carbon double bond functional group, an initiator and a crosslinking catalyst into the extruder, and mixing them for reactive extrusion of a silane grafted polyolefin composition;

(S3) forming the silane grafted polyolefin composition obtained by the reactive extrusion into the shape of a sheet, and stretching the sheet;

(S4) extracting the first diluent and the second diluent from the stretched sheet to produce a porous membrane;

(S5) heat-setting the porous membrane; and (S6) crosslinking the heat-set porous membrane in the presence of moisture, wherein a weight ratio of the polyolefin and the polyolefin elastomer is 94:6 to 65:35, and a ratio of the elapsed time between the introduction of the second diluent and the extrusion to the elapsed time between the introduction of the polyolefin, the polyolefin elastomer and the first diluent and the extrusion is 0.3 to 0.7.

The conventional non-silane crosslinked polyolefin separator has low meltdown temperature, and thus is less safe when used as a separator for an electrochemical device.

To solve this problem, a silane crosslinked polyolefin separator has been introduced, but the shutdown temperature is still high and thus the safety aspect is poor.

The inventors completed the invention to improve the safety of a separator for an electrochemical device by increasing the meltdown temperature and reducing the shutdown temperature.

Hereinafter, the method for manufacturing a crosslinked polyolefin separator according to the present disclosure will be described for each step.

First, a polyolefin, a polyolefin elastomer and a first diluent are put into an extruder and mixed therein (S1).

The polyolefin elastomer is a polyolefin based copolymer. The polyolefin elastomer has good compatability with the polyolefin (for example, high density polyethylene (HDPE)) and a lower melting point than the polyolefin. Accordingly, the polyolefin elastomer can reduce the shutdown temperature of the finally manufactured separator by reducing the melting point of the separator.

In a particular embodiment of the present disclosure, the polyolefin elastomer may include copolymers of at least two of ethylene, propylene, butene, pentene, 4-methylpentene, hexene and octene. In detail, the polyolefin elastomer may be an ethylene-butene copolymer or an ethylene-octene copolymer.

In a particular embodiment of the present disclosure, the melt index of the polyolefin elastomer may be 0.1 to 30 g/10 min, or 0.5 to 10 g/10 min. In the present disclosure, when the polyolefin elastomer having the melt index of 0.1 to 30 g/10 min is used as a starting material for the manufacture of the separator, a melt index difference between the polyolefin elastomer and the polyolefin is not large, so the melt can have uniformity through mixing.

In a particular embodiment of the present disclosure, the polyolefin may be polyethylene; polypropylene; polybutylene; polypentene; polyhexene:polyoctene; or their mixture.

Particularly, the polyethylene includes low density polyethylene (LDPE), linear low density polyethylene (LLDPE) and high density polyethylene (HDPE), and among them, high density polyethylene is the most desirable because of having high crystallinity and a high melting point of resin.

In a particular embodiment of the present disclosure, the weight average molecular weight of the polyolefin may be 200,000 to 1,000,000, or 220,000 to 700,000, or 250,000 to 500,000. In the present disclosure, when high molecular weight polyolefin having the weight average molecular weight of 200,000 to 1,000,000 is used as a starting material for the manufacture of the separator, it is possible to finally obtain the separator having very good strength and heat resistance while ensuring uniformity and film formation of the separator.

In the step (S1), a weight ratio of the polyolefin and the polyolefin elastomer is 94:6 to 65:35.

The inventors put both the polyolefin and the polyolefin elastomer to reduce the shutdown temperature, and controlled their content at a predetermined weight ratio to form a film for the separator.

In a particular embodiment of the present disclosure, the weight ratio of the polyolefin and the polyolefin elastomer may be 94:6 to 65:35, or 92:8 to 68:32, or 90:10 to 70:30.

When the weight ratio of the polyolefin and the polyolefin elastomer satisfies the above-described numerical value, it is possible to manufacture the separator having low shutdown temperature and a suitable strength for use in an electrochemical device. On the contrary, when the polyolefin content is less than 65 weight %, it is impossible to manufacture a separator.

Subsequently, a second diluent, an alkoxy silane containing a carbon-carbon double bond functional group, an initiator and a crosslinking catalyst are put into the extruder, and mixed for reactive extrusion of a silane grafted polyolefin composition (S2).

In the case of the conventional silane crosslinked polyolefin separator, a polyolefin and a diluent, are putted into an extruder all at once, together with an alkoxy silane containing a carbon-carbon double bond functional group, an initiator and a crosslinking catalyst.

However, the present disclosure uses polyolefin and polyolefin elastomer at the same time, and accordingly, it is important to uniformly mix them with the polyolefin and the polyolefin elastomer before crosslinking.

Accordingly, in the present disclosure, the polyolefin, the polyolefin elastomer and the first diluent are first mixed, and then the second diluent, the alkoxy silane containing a carbon-carbon double bond functional group, the initiator and the crosslinking catalyst are putted into the mixed composition.

In the present disclosure, a ratio of the elapsed time between the introduction of the second diluent and the extrusion to the elapsed time between the introduction of the polyolefin, the polyolefin elastomer and the first diluent and the extrusion is 0.3 to 0.7.

In a particular embodiment of the present disclosure, a ratio of the elapsed time between the introduction of the second diluent and the extrusion to the elapsed time between the introduction of the polyolefin, the polyolefin elastomer and the first diluent and the extrusion may be 0.3 to 0.7, or 0.4 to 0.6, or 0.3 to 0.5.

When the ratio of the elapsed time between the introduction of the second diluent and the extrusion to the elapsed time between the introduction of the polyolefin, the polyolefin elastomer and the first diluent and the extrusion satisfies the above-described numerical range, the polyolefin, the polyolefin elastomer and the first diluent are uniformly mixed, and subsequently crosslinking reactions may uniformly occur over the entire separator with an addition of the crosslinking additive. If the crosslinking additive is added when the polyolefin and the polyolefin elastomer are not uniformly mixed, the crosslinking additive chiefly reacts with the polyolefin elastomer having low density, resulting in low crosslinking uniformity of the final separator.

On the contrary, when the ratio of the elapsed time between the introduction of the second diluent, the alkoxy silane containing a carbon-carbon double bond functional group, the initiator and the crosslinking catalyst and the extrusion to the elapsed time between the introduction of the first diluent and the extrusion, the time during which the silane exceeds 0.7, the time for the initiator and the crosslinking catalyst to react with the existing polyolefin and polyolefin elastomer is insufficient and thus the meltdown temperature reduces.

In a particular embodiment of the present disclosure, the first diluent may include liquid or solid paraffin oil, waxes, mineral oil and soybean oil commonly used in a wet process for the manufacture of the separator.

In a particular embodiment of the present disclosure, the first diluent may include diluents that induce liquid-liquid phase separation with the polyolefin, for example, phthalic acid esters such as dibutyl phthalate, dihexyl phthalate and dioctyl phthalate; aromatic ethers such as diphenyl ether and benzyl ether, C10 to C20 fatty acids such as palmitic acid, stearic acid, oleic acid, linoleic acid and linolenic acid; C10 to C20 fatty acid alcohols such as palmityl alcohol, stearyl alcohol and oleyl alcohol; and fatty acid esters resulting from esterification between saturated and unsaturated C4 to C26 fatty acids in the fatty acid group including palmitic acid mono-, di- or triester, stearic acid mono-, di- or triester, oleic acid mono-, di- or triester, linoleic acid mono-, di- or triester, or one or more fatty acids having substitution of double bond of unsaturated fatty acids with epoxy, and alcohol having 1 to 8 hydroxyl groups and 1 to 10 carbon atoms.

The first diluent may include the above-described substances, used singly or in combination.

In a particular embodiment of the present disclosure, the second diluent may be the same or different from the first diluent.

In a particular embodiment of the present disclosure, a weight ratio of the first diluent and the second diluent may be 30:70 to 70:30. When the weight ratio of the first diluent and the second diluent satisfies the above-described numerical range, the polyolefin, the polyolefin elastomer and the first diluent can be very uniformly mixed with each other and subsequently with the second diluent, favorably for reactive extrusion.

In a particular embodiment of the present disclosure, the total content of the first diluent and the second diluent may be 100 to 350 parts by weight, or 125 to 300 parts by weight, or 150 to 250 parts by weight based on 100 parts by weight of the sum of the polyolefin and the polyolefin elastomer. When the total content of the first diluent and the second diluent satisfies the above-described numerical range, it is possible to reduce the problems caused by the high content of the polyolefin and the polyolefin elastomer, such as porosity reduction, pore size reduction, less interconnections between pores, a significant reduction in permeability, a rise in viscosity of the polyolefin and polyolefin elastomer composition, an increase in extrusion load and being difficult to process, and it is also possible to reduce the problems caused by the low content of the polyolefin and the polyolefin elastomer, such as due to low miscibility of the polyolefin and the polyolefin elastomer with the first diluent and the second diluent, consequential failure of thermodynamic mixing of the polyolefin and the polyolefin elastomer with the first diluent and the second diluent and extrusion in a gel state, resulting in break and thickness non-uniformity when stretching.

In a particular embodiment of the present disclosure, the alkoxy silane containing a carbon-carbon double bond functional group is a crosslinking agent that causes silane crosslinking reactions, and serves to crosslink the polyolefin by grafting onto the polyolefin by the carbon-carbon double bond functional group, to be exact, a vinyl group, and a moisture crosslinking process by an alkoxy group.

In a particular embodiment of the present disclosure, the alkoxy silane containing a carbon-carbon double bond functional group may include a compound represented by the following chemical formula 1:

[Chemical formula 1]

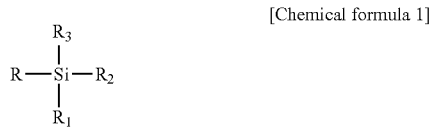

In the chemical formula 1, each of the $R_1$, $R_2$, and $R_3$ is independently a C1 to C10 alkoxy group or a C1 to C10 alkyl group, and in this instance, at least one of the $R_1$, $R_2$, and $R_3$ is an alkoxy group.

The R is a vinyl group, an acryloxy group, a methacryloxy group or a C1 to C20 alkyl group, and in this instance, at least one hydrogen of the alkyl group is substituted with a vinyl group, an acryl group, an acryloxy group, a methacryloxy group or a methacryl group.

Additionally, the R may further include an amino group, an epoxy group or an isocyanate group.

In a particular embodiment of the present disclosure, the alkoxy silane containing a carbon-carbon double bond functional group may include vinyltrimethoxysilane, vinyltriethoxysilane, vinyltriacetoxysilane, (3-methacryloxypropyl)trimethoxysilane, (3-methacryloxypropyl)triethoxysilane, vinylmethyldimethoxysilane, vinyl-tris(2-methoxyethoxy)silane, vinylmethyldiethoxysilane, or their mixture.

In a particular embodiment of the present disclosure, the alkoxy silane containing a carbon-carbon double bond functional group may be present in an amount of 0.1 to 3.0 parts by weight, or 0.2 to 2.0 parts by weight, or 0.3 to 1.5 parts by weight based on 100 parts by weight of the sum of the polyolefin, the polyolefin elastomer, the first diluent and the second diluent. When the amount of the alkoxy silane containing carbon-carbon double bond functional group satisfies the above-described numerical range, it is possible to prevent the problem caused by the low silane content such as a low graft yield and less crosslinking, or the problem caused by the high silane content such as the presence of unreacted silane and bad appearance of the extruded sheet.

In a particular embodiment of the present disclosure, the initiator includes any type of initiator that can produce radicals without limitation. Non-limiting examples of the initiator include 2,5-dimethyl-2,5-di(tert-butylperoxy) hexane (DHBP), benzoyl peroxide, acetyl peroxide, dilauryl peroxide, di-ter-butyl peroxide, dicumyl peroxide, cumyl peroxide, hydrogen peroxide and potassium persulfate.

In a particular embodiment of the present disclosure, the initiator may be present in an amount of 0.1 to 20 parts by weight, or 0.5 to 10 parts by weight, or 1 to 5 parts by weight based on 100 parts by weight of the alkoxy group-containing vinyl silane. When the initiator content satisfies the above-described numerical range, it is possible to prevent the silane graft yield reduction caused by the low initiator content, or crosslinking between polyolefin in the extruder due to the high initiator content.

In a particular embodiment of the present disclosure, the crosslinking catalyst is added to promote the silane crosslinking reactions.

In a particular embodiment of the present disclosure, the crosslinking catalyst may include carboxylate of metal, for example, tin, zinc, iron, lead and cobalt, an organic base, an inorganic acid and an organic acid. Non-limiting examples of the crosslinking catalyst includes the carboxylate of metal including dibutyltin dilaurate, dibutyltin diacetate, Tin(II) acetate, Tin(II) caprylate, zinc naphthenate, zinc caprylate and cobalt naphthenate, the organic base including ethylamine, dibutylamine, hexyl amine and pyridine, the inorganic acid including sulfuric acid and hydrochloric acid, and the organic acid including toluene, sulfonic acid, acetic acid, stearic acid and maleic acid. Additionally, the crosslinking catalyst may use them singly or in combination.

In a particular embodiment of the present disclosure, the crosslinking catalyst may be present in an amount of 0.1 to 20 parts by weight, 0.5 to 10 parts by weight, 1 to 5 parts by weight based on 100 parts by weight of the alkoxy silane containing a carbon-carbon double bond functional group. When the amount of the crosslinking catalyst satisfies the above-described numerical range, silane crosslinking reactions of desired level may occur, and an unwanted side reaction does not occur in the lithium secondary battery. Additionally, the cost problem such as the waste of the crosslinking catalyst does not occur.

In a particular embodiment of the present disclosure, the silane grafted polyolefin composition may further include general additives for improving a specific function, for example, an oxidation stabilizing agent, a UV stabilizing agent, an antistatic agent and a nucleating agent, if necessary.

In a particular embodiment of the present disclosure, the reactive extrusion step may use a single or twin screw extruder.

Subsequently, the silane grafted polyolefin composition obtained through the reactive extrusion is formed in the form of a sheet which in turn, is stretched (S3).

For example, the silane grafted polyolefin composition obtained through the reactive extrusion may be extruded using an extruder with a T-dice, and cooled by a typical casting or calendaring method using water cooling and air cooling, yielding a cooled extruded product.

In a particular embodiment of the present disclosure, as described above, the stretching step may provide the separator with improved mechanical strength and puncture strength.

In a particular embodiment of the present disclosure, the stretching may be performed by successive or simultaneous stretching using a roll or a tenter. The stretch ratio is 3 times or more each in the longitudinal direction and the transverse direction, or between 4 times and 10 times, and the total stretch ratio may be between 14 times and 100 times. When the stretch ratio satisfies the above-described numerical range, it is possible to solve the problem with reductions in tensile strength and puncture strength caused by insufficient orientation in one direction, and at the same time, the property imbalance between the longitudinal direction and the transverse direction, and when the total stretch ratio satisfies the above-described numerical range, it is possible to avoid the problem with non-stretching or failure to form pores.

In a particular embodiment of the present disclosure, the stretching temperature may change depending on the melting point of the polyolefin used and the concentration and type of the diluent used.

In a particular embodiment of the present disclosure, for example, when the used polyolefin is polyethylene and the diluent is liquid paraffin, the stretching temperature may be 70 to 160° C., or 90 to 140° C., or 100 to 130° C. for longitudinal (MD) stretching, 90 to 180° C., or 110 to 160° C. or 120 to 150° C. for transverse (TD) stretching, and 90 to 180° C., or 110 to 160° C., or 110 to 150° C. when stretching is performed simultaneously in two directions.

When the stretching temperature satisfies the above-described numerical range, as has a low temperature range, it is possible to avoid the problem caused by the low stretching temperature such as break or non-stretching occurring in the absence of softness, and it is possible to prevent the partial overstretching or property difference caused by the high stretching temperature.

Subsequently, the first diluent and the second diluent are extracted from the stretched sheet to produce a porous membrane (S4).

In a particular embodiment of the present disclosure, the first diluent and the second diluent may be extracted from the porous membrane using an organic solvent, and the porous membrane may be dried.

In a particular embodiment of the present disclosure, the organic solvent includes any type of organic solvent that can extract the diluent without limitation, and methyl ethyl ketone, methylene chloride and hexane with high extraction efficiency and quick drying are proper.

In a particular embodiment of the present disclosure, the extraction method includes all general solvent extraction methods, for example, an immersion method, a solvent spraying method and an ultrasonic method, used singly or in combination. An amount of the diluent remaining after the extraction process is preferably 1 weight % or less. When the amount of the remaining diluent exceeds 1 weight %, the properties degrade and the permeability of the porous membrane reduces. The amount of the remaining diluent may be affected by the extraction temperature and the extraction time, and for the increased solubility of the diluent and the organic solvent, it is good that the extraction temperature is high, but when considering the safety problem caused by the boiling of the organic solvent, 40° C. or less is desirable. When the extraction temperature is equal to or less than the freezing point of the diluent, the extraction efficiency greatly reduces, and accordingly the extraction temperature must be higher than the freezing point of the diluent.

Additionally, the extraction time changes depending on the thickness of the porous membrane, but when the porous membrane is 5 to 15 μm in thickness, 1 to 4 min is proper.

Subsequently, the porous membrane is heat-set (S5).

The heat-setting works to forcibly eliminate the tendency of the porous membrane to shrink and remove the residual stress, by fixing the porous membrane and applying heat.

In a particular embodiment of the present disclosure, the heat-setting temperature may be 100 to 140° C., or 105 to 135° C., or 110 to 130° C.

In case that the polyolefin is polyethylene, when the heat-setting temperature satisfies the above-described numerical range, rearrangement of polyolefin molecules occurs, thereby removing the residual stress of the porous membrane, and due to the partial melting, pore clogging of the porous membrane may reduce.

In a particular embodiment of the present disclosure, the time of the heat-setting temperature may be 10 to 120 sec, 20 to 90 sec, or 30 to 60 sec. When the heat-setting is performed for the above-described amount of time, rearrangement of polyolefin molecules occurs, thereby removing the residual stress of the porous membrane, and due to the partial melting, pore clogging of the porous membrane may reduce.

Subsequently, the heat-set porous membrane is crosslinked in the presence of moisture (S6).

In a particular embodiment of the present disclosure, the crosslinking may be performed at 60 to 100° C., or 65 to 95° C., or 70 to 90° C.

In a particular embodiment of the present disclosure, the crosslinking may be performed at the humidity of 60 to 95% for 6 to 50 hr.

In a particular embodiment of the present disclosure, a difference between shutdown temperature and meltdown temperature of the separator may be 25° C. to 70° C., or 30 to 60° C., or 45 to 52° C.

In a particular embodiment of the present disclosure, the shutdown temperature of the separator may be 135° C. or less, or 133° C. or less, or 131° C. or less.

In a particular embodiment of the present disclosure, the meltdown temperature of the separator may be 160° C. or above, or 170° C. or above, or 176° C. or above.

According to another aspect of the present disclosure, there may be provided a crosslinked polyolefin separator manufactured by the manufacturing method.

Hereinafter, the present disclosure will be described in detail through examples. The examples of the present disclosure, however, may be modified in many other forms, and the scope of the present disclosure should not be construed as being limited to the following examples. The examples of the present disclosure are provided to fully explain the present disclosure to those having ordinary knowledge in the art to which the present disclosure pertains.

Example 1

First, 6.3 kg of high density polyethylene having the weight average molecular weight of 350,000 (Korea Petrochemical, VH035) as a polyolefin, 0.7 kg of ethylene-octene copolymer having the melt index (ASTM D1238) of 1.2 g/10 min as a polyolefin elastomer, and 9.1 kg of liquid paraffin oil (Kukdong Oil & Chemicals, LP 350F, 68 cSt) as a first diluent are put into an extruder and mixed therein. That is, a weight ratio of the polyolefin and the polyolefin elastomer is adjusted to 90:10.

Subsequently, 3.9 kg of liquid paraffin oil (Kukdong Oil & Chemicals, LP 350F, 68 cSt) as a second diluent, 200 g of vinyltrimethoxysilane as an alkoxy silane containing a carbon-carbon double bond functional group, 4 g of dibutyltin dilaurate as a crosslinking catalyst, and 4 g of 2,5-dimethyl-2,5-di(tert-butylperoxy)hexane (DHBP) as an initiator are put into the extruder and mixed therein.

In this instance, a ratio of the elapsed time between the introduction of the second diluent and the extrusion to the elapsed time between the introduction of the polyolefin, the polyolefin elastomer and the first diluent and the extrusion is 50%. That is, the elapsed time between the introduction of the second diluent and the extrusion is about 0.5 times of the elapsed time between the introduction of the polyolefin, the polyolefin elastomer and the first diluent and the extrusion. In detail, the elapsed time between the introduction of the polyolefin, the polyolefin elastomer and the first diluent and the extrusion is 210 sec, and the elapsed time between the introduction of the second diluent and the extrusion is 106 sec.

Subsequently, reactive extrusion is performed under the temperature condition of 200° C. to prepare a silane grafted polyolefin composition.

The prepared silane grafted polyolefin composition is formed into the shape of a sheet through a T dice and a cooling casting roll, and subsequently biaxial stretching is performed using a tenter type successive stretching machine in MD direction first and then in TD direction. The MD stretch ratio and the TD stretch rate are all 7.0 times. The stretching temperature is 110° C. in MD and 125° C. in TD.

The diluent is extracted from the stretched sheet using methylene chloride, and heat-setting is performed at 126° C. to produce a porous membrane. The porous membrane is crosslinked at 85° C. and 85% relative humidity condition for 24 hr to manufacture a crosslinked polyolefin separator. The obtained crosslinked polyolefin separator is 8.9 µm in thickness.

Example 2

A separator is manufactured by the same method as example 1 except that a weight ratio of polyolefin and polyolefin elastomer is adjusted to 80:20. The obtained crosslinked polyolefin separator is 9.1 µm in thickness.

Example 3

A separator is manufactured by the same method as example 1 except that a weight ratio of polyolefin and polyolefin elastomer is adjusted to 70:30. The obtained crosslinked polyolefin separator is 9.1 µm in thickness.

Example 4

A separator is manufactured by the same method as example 1 except that a ratio of the elapsed time between the introduction of the second diluent, the vinyltrimethoxysilane, the initiator and the crosslinking catalyst and the extrusion to the elapsed time between the introduction of the polyolefin, the polyolefin elastomer and the first diluent and the extrusion is adjusted to 0.3.

In detail, the elapsed time between the introduction of the polyolefin, the polyolefin elastomer and the first diluent and the extrusion is 210 sec, and the elapsed time between the introduction of the second diluent, the alkoxy silane containing a carbon-carbon double bond functional group, the initiator, and the crosslinking catalyst and the extrusion is 65 sec.

The obtained crosslinked polyolefin separator is 9.0 an in thickness.

Comparative Example 1

A separator is manufactured by the same method as example 1 except that a weight ratio of polyolefin and polyolefin elastomer is adjusted to 60:40. However, comparative example 1 is impossible to manufacture a separator.

Comparative Example 2

A separator is manufactured by the same method as example 1 except that a ratio of the elapsed time between the introduction of the second diluent, the alkoxy silane containing a carbon-carbon double bond functional group, the initiator and the crosslinking catalyst and the extrusion to the elapsed time between the introduction of the polyolefin, the polyolefin elastomer and the first diluent and the extrusion is controlled as below.

In detail, the elapsed time between the introduction of the polyolefin, the polyolefin elastomer and the first diluent and the extrusion is 210 sec, and the elapsed time between the introduction of the second diluent, the alkoxy silane containing a carbon-carbon double bond functional group, the initiator and the crosslinking catalyst and the extrusion is 170 sec. That is, the elapsed time between the introduction of the second diluent, the alkoxy silane containing a carbon-carbon double bond functional group, the initiator and the crosslinking catalyst and the extrusion is about 0.8 times of the elapsed time between the introduction of the polyolefin, the polyolefin elastomer and the first diluent and the extrusion. In other words, the ratio of the elapsed time between the second diluent, the alkoxy silane containing a carbon-carbon double bond functional group, the initiator and the crosslinking catalyst and the extrusion to the elapsed time between the introduction of the polyolefin, the polyolefin elastomer and the first diluent and the extrusion is 80%.

The obtained crosslinked polyolefin separator is 8.8 nm in thickness.

Comparative Example 3

In comparative example 3, a crosslinking additive is not added. That is, it is a non-crosslinked polyolefin separator, not a silane grafted polyolefin separator.

First, 6.3 kg of high density polyethylene having the weight average molecular weight of 350,000 (Korea Petrochemical, VH035) as a polyolefin, 0.7 kg of ethylene-octene copolymer having the melt index (ASTM D1238) of 1.2 g/10 min as a polyolefin elastomer, and 9.1 kg of liquid paraffin oil (Kukdong Oil & Chemicals, LP 350F, 68 cSt) as a first diluent are put into an extruder and mixed therein. That is, a weight ratio of the polyolefin and the polyolefin elastomer is adjusted to 90:10.

Subsequently, 3.9 kg of liquid paraffin oil (Kukdong Oil & Chemicals, LP 350F, 68 cSt) as a second diluent is put into the extruder and mixed therein.

In this instance, a ratio of the elapsed time between the introduction of the second diluent and the extrusion to the elapsed time between the introduction of the polyolefin, the polyolefin elastomer and the first diluent and the extrusion is 50%. That is, the elapsed time between the introduction of the second diluent and the extrusion is about 0.5 times of the elapsed time between the introduction of the polyolefin, the polyolefin elastomer and the first diluent and the extrusion. In detail, the elapsed time between the introduction of the polyolefin, the polyolefin elastomer and the first diluent and the extrusion is 210 sec, and the elapsed time between the introduction of the second diluent and the extrusion is 106 sec.

Subsequently, extrusion is performed under the temperature condition of 200° C. to prepare a polyolefin composition.

The prepared polyolefin composition is formed into the shape of a sheet through a T dice and a cooling casting roll, and subsequently biaxial stretching is performed using a tenter type successive stretching machine in MD direction first and then in TD direction. The MD stretch ratio and the TD stretch rate are all 7.0 times. The stretching temperature is 110° C. in MD and 125° C. in TD.

The diluent is extracted from the stretched sheet using methylene chloride, and heat-setting is performed at 126° C. to produce a porous membrane. The porous membrane is crosslinked at 85° C. and 85% relative humidity condition for 24 hr to manufacture a non-crosslinked polyolefin separator. The obtained non-crosslinked polyolefin separator 9.1 µm is in thickness.

Comparative Example 4

In comparative example 4, a polyolefin elastomer is not added.

In detail, 7.0 kg of high density polyethylene having the weight average molecular weight of 350,000 (Korea Petrochemical, VH035) as a polyolefin and 9.1 kg of liquid paraffin oil (Kukdong Oil & Chemicals, LP 350F, 68 cSt) as a first diluent are put into an extruder and mixed therein.

Subsequently, 3.9 kg of liquid paraffin oil (Kukdong Oil & Chemicals, LP 350F, 68 cSt) as a second diluent, 200 g of vinyltrimethoxysilane as alkoxy silane containing a carbon-carbon double bond functional group, 4 g of dibutyltin dilaurate as a crosslinking catalyst, and 4 g of 2,5-dimethyl-2,5-di(tert-butylperoxy)hexane (DHBP) as an initiator are put into the extruder and mixed therein.

In this instance, a ratio of the elapsed time between the introduction of the second diluent and the extrusion to the elapsed time between the introduction of the polyolefin and the first diluent and the extrusion is 50%. That is, the elapsed time between the introduction of the second diluent and the extrusion is about 0.5 times of the elapsed time between the introduction of the polyolefin and the first diluent and the extrusion. In detail, the elapsed time between the introduction of the polyolefin and the first diluent and the extrusion is 210 sec, and the elapsed time between the introduction of the second diluent and the extrusion is 106 sec.

Subsequently, reactive extrusion is performed under the temperature condition of 200° C. to prepare a silane grafted polyolefin composition.

The prepared silane grafted polyolefin composition is formed into the shape of a sheet through a T dice and a cooling casting roll, and subsequently biaxial stretching is performed using a tenter type successive stretching machine in MD direction first and then in TD direction. The MD stretch ratio and the TD stretch rate are all 7.0 times. The stretching temperature is 110° C. in MD and 125° C. in TD.

The diluent is extracted from the stretched sheet using methylene chloride, and heat-setting is performed at 126° C. to produce a porous membrane. The porous membrane is crosslinked at 85° C. and 85% relative humidity condition for 24 hr to manufacture a crosslinked polyolefin separator. The obtained crosslinked polyolefin separator is 9.0 nm in thickness.

Comparative Example 5

In comparative example 5, a polyolefin elastomer and a crosslinking additive are not added. That is, it is a non-crosslinked polyolefin separator.

First, 7.0 kg of high density polyethylene having the weight average molecular weight of 350,000 (Korea Petrochemical, VH035) as a polyolefin and 9.1 kg of liquid paraffin oil (Kukdong Oil & Chemicals, LP 350F, 68 cSt) as a first diluent are put into an extruder and mixed therein.

Subsequently, 3.9 kg of liquid paraffin oil (Kukdong Oil & Chemicals, LP 350F, 68 cSt) as a second diluent is put into the extruder and mixed therein.

In this instance, a ratio of the elapsed time between the introduction of the second diluent and the extrusion to the elapsed time between the introduction of the polyolefin and the first diluent and the extrusion is 50%. That is, the elapsed time between the introduction of the second diluent and the extrusion is about 0.5 times of the elapsed time between the introduction of the polyolefin and the first diluent and the extrusion. In detail, the elapsed time between the introduction of the polyolefin and the first diluent and the extrusion is 210 sec, and the elapsed time between the introduction of the second diluent and the extrusion is 106 sec.

Subsequently, extrusion is performed under the temperature condition of 200° C. to produce a polyolefin composition.

The prepared polyolefin composition is formed into the shape of a sheet through a T dice and a cooling casting roll, and subsequently biaxial stretching is performed using a tenter type successive stretching machine in MD direction first and then in TD direction. The MD stretch ratio and the TD stretch rate are all 7.0 times. The stretching temperature is 110° C. in MD and 125° C. in TD.

The diluent is extracted from the stretched sheet using methylene chloride, and heat-setting is performed at 126° C. to produce a porous membrane. The porous membrane is crosslinked at 85° C. and 85% relative humidity condition for 24 hr to manufacture a non-crosslinked polyolefin separator. The obtained non-crosslinked polyolefin separator is 9.1 μm in thickness.

Comparative Example 6

A separator is manufactured by the same method as comparative example 2 except that a ratio of the elapsed time between the introduction of the second diluent, the vinylsilane, the initiator and the crosslinking catalyst and the extrusion to the elapsed time between the introduction of the polyolefin, the polyolefin elastomer and the first diluent and the extrusion is adjusted to 0.2.

In detail, the elapsed time between the introduction of the polyolefin, the polyolefin elastomer and the first diluent and the extrusion is 210 sec, and the elapsed time between the introduction of the second diluent, the alkoxy silane containing a carbon-carbon double bond functional group, the initiator and the crosslinking catalyst and the extrusion is 41 sec.

The obtained crosslinked polyolefin separator is 9.2 μm in thickness.

Comparative Example 7

A crosslinked polyolefin separator is manufactured in the same way as example 1 except that the polyolefin, the polyolefin elastomer, the alkoxy silane containing a carbon-carbon double bond functional group, the initiator, the crosslinking catalyst and the diluent are put into the extruder all at once.

Their amounts in the extruder is as below:

6.3 kg of high density polyethylene having the weight average molecular weight of 350,000 (Korea Petrochemical, VH035) as the polyolefin, 0.7 kg of ethylene-octene copolymer having the melt index (ASTM D1238) of 1.2 g/10 min as the polyolefin elastomer, 200 g of vinyltrimethoxysilane as the alkoxy silane containing a carbon-carbon double bond functional group, 4 g of dibutyltin dilaurate as the crosslinking catalyst, 4 g of 2,5-dimethyl-2,5-di(tert-butylperoxy)hexane (DHBP) as the initiator, and 13 kg of liquid paraffin oil (Kukdong Oil & Chemicals, LP 350F, 68 cSt) as the diluent are mixed together.

In this instance, the elapsed time between the introduction of the materials into the extruder and the extrusion is 210 sec.

Experimental Example

The results of examples 1 to 4 and comparative examples 1 to 7 are shown in the following Table 1.

additive is much lower than those of examples. Additionally, comparative examples 4 and 5 without a polyolefin elastomer show high shutdown temperatures of 138° C. and 139° C. respectively.

TABLE 1

| | Example 1 | Example 2 | Example 3 | Example 4 | Com. Example 1 | Com. Example 2 | Com. Example 3 | Com. Example 4 | Com. Example 5 | Com. Example 6 | Com. Example 7 |
|---|---|---|---|---|---|---|---|---|---|---|---|
| Weight ratio of polyolefin:polyolefin elastomer | 90:10 | 80:20 | 70:30 | 90:10 | 60:40 | 90:10 | 90:10 | 100:0 | 100:0 | 90:10 | 90:10 |
| With or without alkoxy silane containing a carbon-carbon double bond functional group, initiator, crosslinking catalyst | ○ | ○ | ○ | ○ | ○ | ○ | X | ○ | X | ○ | ○ |
| Ratio of elapsed time between introduction of second diluent, vinyl silane, initiator and crosslinking catalyst and extrusion to elapsed time between introduction of polyolefin, polyolefin elastomer and first diluent and extrusion | 0.5 | 0.5 | 0.5 | 0.3 | 0.5 | 0.8 | 0.5 | 0.5 | 0.5 | 0.2 | 1.0 |
| Separator thickness (μm) | 8.9 | 9.1 | 9.1 | 9.0 | Film formation failed | 8.8 | 9.1 | 9.0 | 9.1 | 9.2 | 9.0 |
| Shutdown temperature (° C.) | 131 | 129 | 127 | 131 | | 132 | 132 | 138 | 139 | 132 | 132 |
| Meltdown temperature (° C.) | 183 | 180 | 179 | 176 | | 159 | 149 | 181 | 151 | 155 | 157 |

(1) Method for Measuring the Thickness of the Separator:

The thickness of the separator is measured using a thickness measuring device (Mitutoyo, VL-50S-B).

(2) Method for Measuring the Shutdown Temperature of the Separator:

For the shutdown temperature, air permeability of the separator is measured, with the separator being exposed to the increasing temperature condition (5° C./min starting from 30° C.). The shutdown temperature of the separator is defined as temperature when air permeability (Gurley number) of the microporous membrane exceeds 100,000 sec/100 cc for the first time. In this instance, the air permeability of the separator may be measured using air permeability measurement instrument (Asahi Seiko, EGO-IT) in accordance with JIS P8117.

(3) Method for Measuring the Meltdown Temperature of the Separator:

The meltdown temperature is measured using thermal mechanical analysis (TMA).

In detail, a load of 0.01N is applied to the separator, the extent of deformation is observed while increasing the temperature at the rate of 5° C./min, and as the temperature increases, the separator shrinks, and then expands, and the temperature at rupture is measured as 'meltdown temperature of separator'. It is said that as the meltdown temperature is higher, the melt integrity is maintained and dimensional stability is ensured at high temperature.

(4) Method for Measuring the Melt Index of the Polyolefin Elastomer:

The melt index is measured using ASTM D1238.

As can be seen from Table 1, the meltdown temperature of comparative examples 3 and 5 without a crosslinking When as in comparative example 1, when the amount of polyolefin elastomer is too large, it is impossible to manufacture a separator itself. When as in comparative example 2, the crosslinking additive is introduced earlier, the meltdown temperature reduces due to the insufficient reaction time between the crosslinking additive and the polyolefin.

That is, it can be seen that the separator according to an aspect of the present disclosure can attain a desired effect of the present disclosure by controlling both the weight ratio of polyolefin and polyolefin and when to introduce the input materials.

What is claimed is:

1. A method for manufacturing a crosslinked polyolefin separator, comprising:
   (S1) introducing a mixture including a polyolefin, a polyolefin elastomer and a first diluent into an extruder and uniformly mixing the mixture;
   (S2) subsequently introducing a second diluent, an alkoxy silane containing a carbon-carbon double bond functional group, an initiator and a crosslinking catalyst into the mixture in the extruder for reactive extrusion of a silane grafted polyolefin composition;
   (S3) forming the silane grafted polyolefin composition obtained by the reactive extrusion into a shape of a sheet and stretching the sheet;
   (S4) extracting the first diluent and the second diluent from the stretched sheet to produce a porous membrane;
   (S5) heat-setting the porous membrane; and
   (S6) crosslinking the heat-set porous membrane in the presence of moisture,
   wherein a weight ratio of the polyolefin and the polyolefin elastomer is 94:6 to 65:35, and a ratio of an elapsed time between the introducing of the second diluent and the reactive extrusion to an elapsed time between the introducing of the polyolefin, the polyolefin elastomer and the first diluent and the reactive extrusion is 0.3 to 0.7.

2. The method according to claim 1, wherein a weight average molecular weight of the polyolefin is 200,000 to 1,000,000.

3. The method according to claim 1, wherein the polyolefin elastomer includes a copolymer of at least two of ethylene, propylene, butene, pentene, 4-methylpentene, hexene and octene.

4. The method according to claim 1, wherein a melt index of the polyolefin elastomer is 0.1 to 30 g/10 min.

5. The method according to claim 1, wherein a temperature of the heat-setting is 100° C. to 140° C.

6. The method according to claim 1, wherein the weight ratio of the polyolefin and the polyolefin elastomer is 90:10 to 70:30.

7. The method according to claim 1, wherein the ratio of the elapsed time between the introduction of the second diluent and the extrusion to the elapsed time between the introduction of the polyolefin, the polyolefin elastomer and the first diluent and the extrusion is 0.3 to 0.5.

8. The method according to claim 1, wherein a difference between a shutdown temperature and a meltdown temperature of the separator is 25° C. to 70° C.

9. The method according to claim 8, wherein the shutdown temperature of the separator is 135° C. or less, and the meltdown temperature of the separator is 160° C. or above.

10. The method according to claim 1, wherein a weight ratio of the first diluent and the second diluent is 30:70 to 70:30.

11. A crosslinked polyolefin separator manufactured by the method according to claim 1.

* * * * *